Sept. 8, 1936.  F. E. LONAS ET AL  2,053,962
CONNECTING ROD AND METHOD OF MAKING THE SAME
Filed Aug. 8, 1934  4 Sheets-Sheet 2

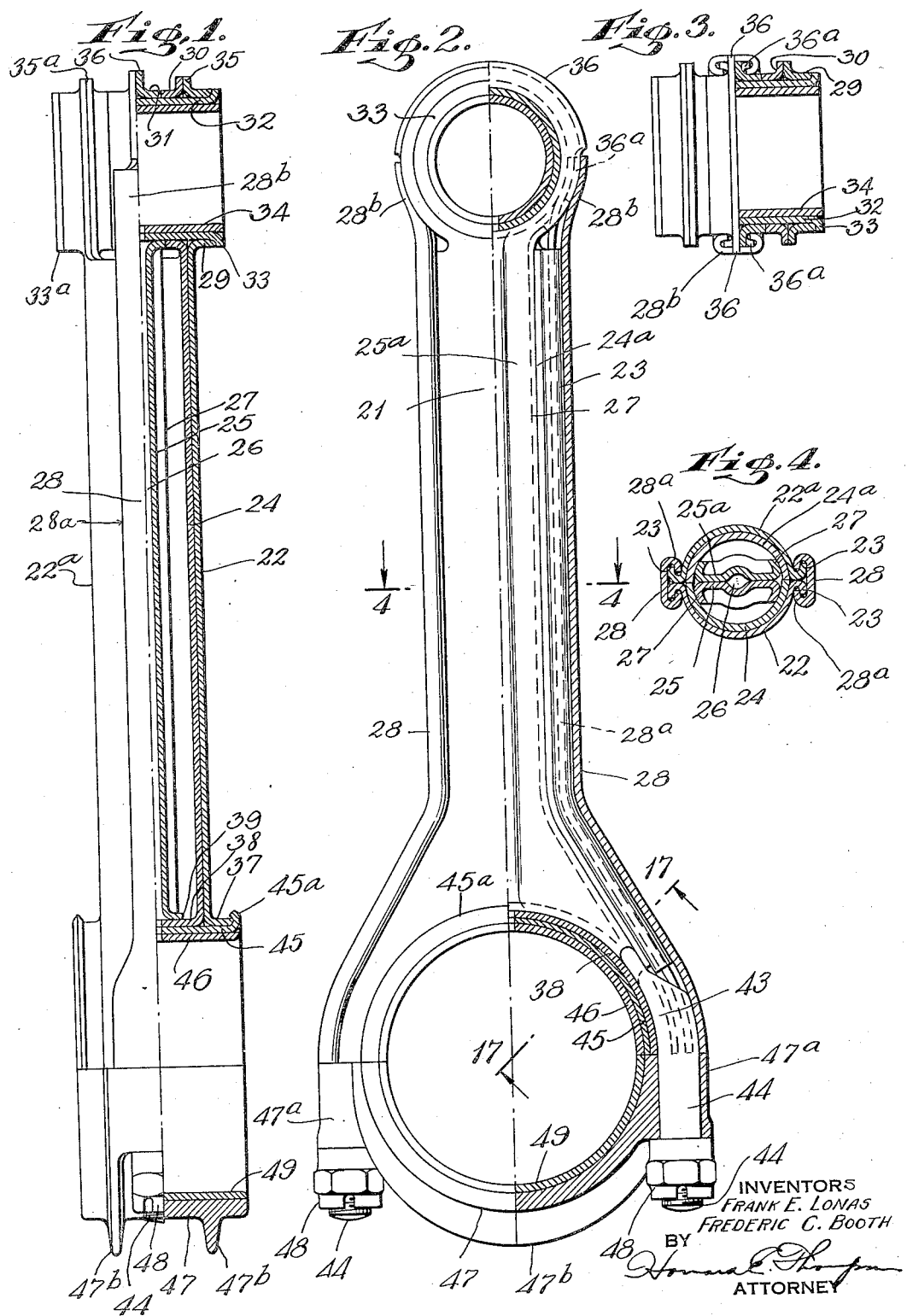

INVENTORS
FRANK E. LONAS
FREDERIC C. BOOTH
BY
ATTORNEY

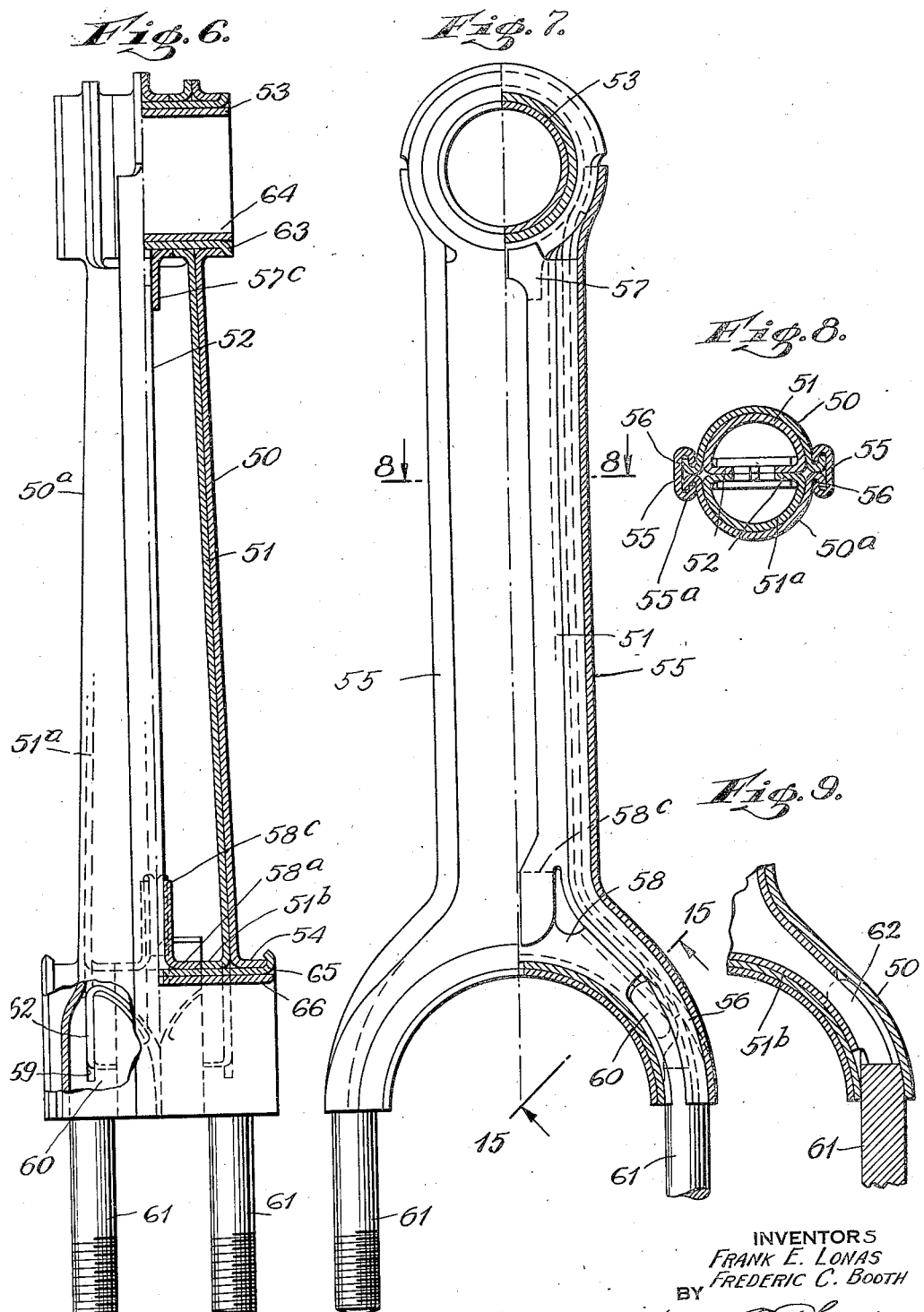

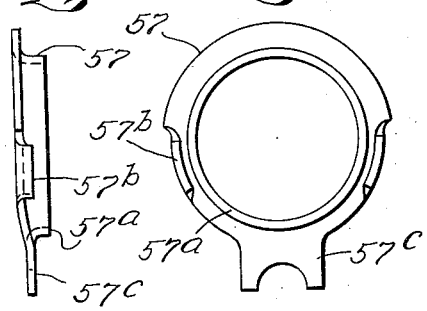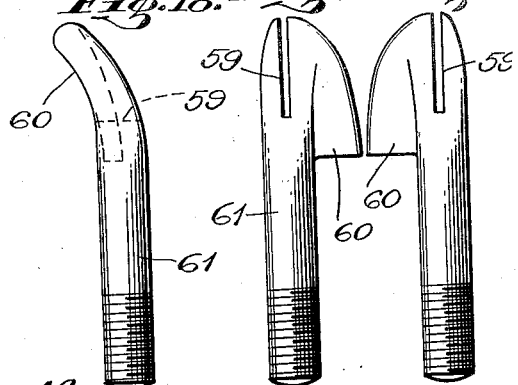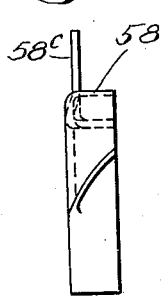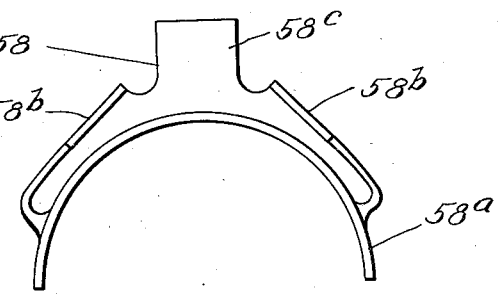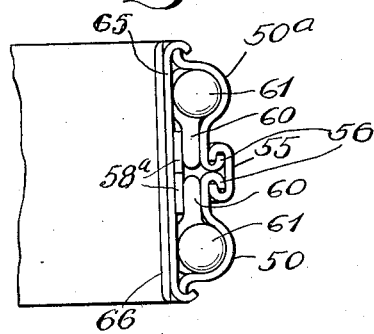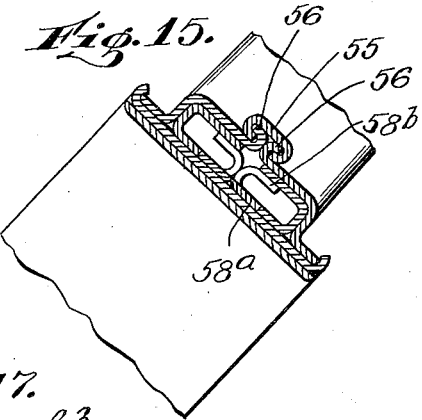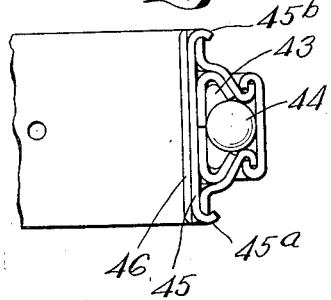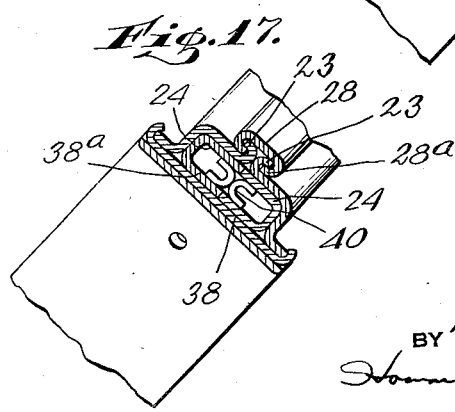

Patented Sept. 8, 1936

2,053,962

UNITED STATES PATENT OFFICE 2,053,962

CONNECTING ROD AND METHOD OF MAKING THE SAME

Frank E. Lonas, Jackson Heights, and Frederic C. Booth, Mount Vernon, N. Y.; said Booth assignor to said Lonas; Kathryn B. Lonas, executrix of said Frank E. Lonas, deceased Application August 8, 1934, Serial No. 738,957

14 Claims. (Cl. 74—588)

This invention relates to connecting rods and particularly to rods fashioned from a plurality of pre-shaped sheet metal parts which are assembled and secured together in forming the complete rods; and the object of the invention is to provide a rod composed of a plurality of sheet metal parts which are so fashioned as to form when assembled a substantially tubular shank portion extending from the small or wrist pin bearing end of the rod to the large crank shaft bearing end thereof, and wherein said tubular shank includes reinforcing flanges or other members extending longitudinally thereof and onto the small and large end bearings at points wide spread with respect to the longitudinal center of such bearings to dispose the wall of the shank and said reinforcements adjacent the outer ends of the bearings; a further object of the invention consists in utilizing coupling strips for uniting the several parts of the rod and to retain the same against relative movement; a further object being to provide an improved method of joining the rod parts by copper brazing the adjacent or abutting surfaces of the parts in a hydrogen electric furnace or in a hydrogen or similar atmosphere to firmly unite the parts at the surface contact areas thereof, thereby more equally distributing the load or stresses and strains to which the rod is subjected throughout the entire material of the separate rod parts and permitting the construction of the rod from relatively thin sheet metal parts which will result in the formation of a light, strong as well as balanced rod; a further object being to provide a large or crank shaft bearing end of the rod with studs having headed ends fashioned to seat in and conform to the contour of said end portion of the rod and to be firmly retained within and between rod parts against rotary or other relative movement with respect to the parts; a still further object being to provide a rod of the class described wherein two of the parts form centrally of the shank portion thereof an oil passage or duct whereby lubricating oil may be transmitted from one bearing to the other; and with these and other objects in view, the invention consists in a rod of the class and for the purpose specified, which is simple in construction, efficient in use, and which is constructed as hereinafter described and claimed.

The invention is fully disclosed in the following specification, of which the accompanying drawings form a part, in which the separate parts of the improvement are designated by suitable reference characters in each of the views, and in which:

Fig. 1 is a side and sectional view of one form of rod which is employed.

Fig. 2 is a view taken at right angles to that shown in Fig. 1, showing part of the rod in section and the other part in elevation.

Fig. 3 is a plan and sectional view of the wrist pin bearing end of the rod shown in Figs. 1 and 2.

Fig. 4 is a transverse section on the line 4—4 of Fig. 2.

Fig. 6 is a view similar to Fig. 1 and showing a modified form of rod.

Fig. 7 is a view similar to Fig. 2 of the rod shown in Fig. 6.

Fig. 8 is a transverse section on the line 8—8 of Fig. 7.

Fig. 9 is a sectional detail view of a part of the construction shown in Figs. 6 and 7.

Fig. 10 is a side edge view of one of a pair of parts employed at the wrist pin bearing end of the rod shown in Figs. 6 and 7.

Fig. 11 is a face view of the parts shown in Fig. 10.

Fig. 12 is a side edge view of one of a pair of parts employed at the crank shaft bearing end of the rod shown in Figs. 6 and 7.

Fig. 13 is a face view of the parts shown in Fig. 12.

Fig. 14 is a bottom plan view of one side portion of the rod shown in Figs. 6 and 7.

Fig. 15 is a partial section on the line 15—15 of Fig. 7.

Fig. 16 is a bottom plan view of one side portion of the rod shown in Figs. 1 and 2 with the cap removed.

Fig. 17 is a partial section on the line 17—17 of Fig. 2.

Fig. 18 is a side edge view of one of a number of studs employed in the rods shown in Figs. 6 and 7 detached; and, Figs. 19 and 20 are face views of left and right studs, one of which is shown in Fig. 18.

Figure 5:
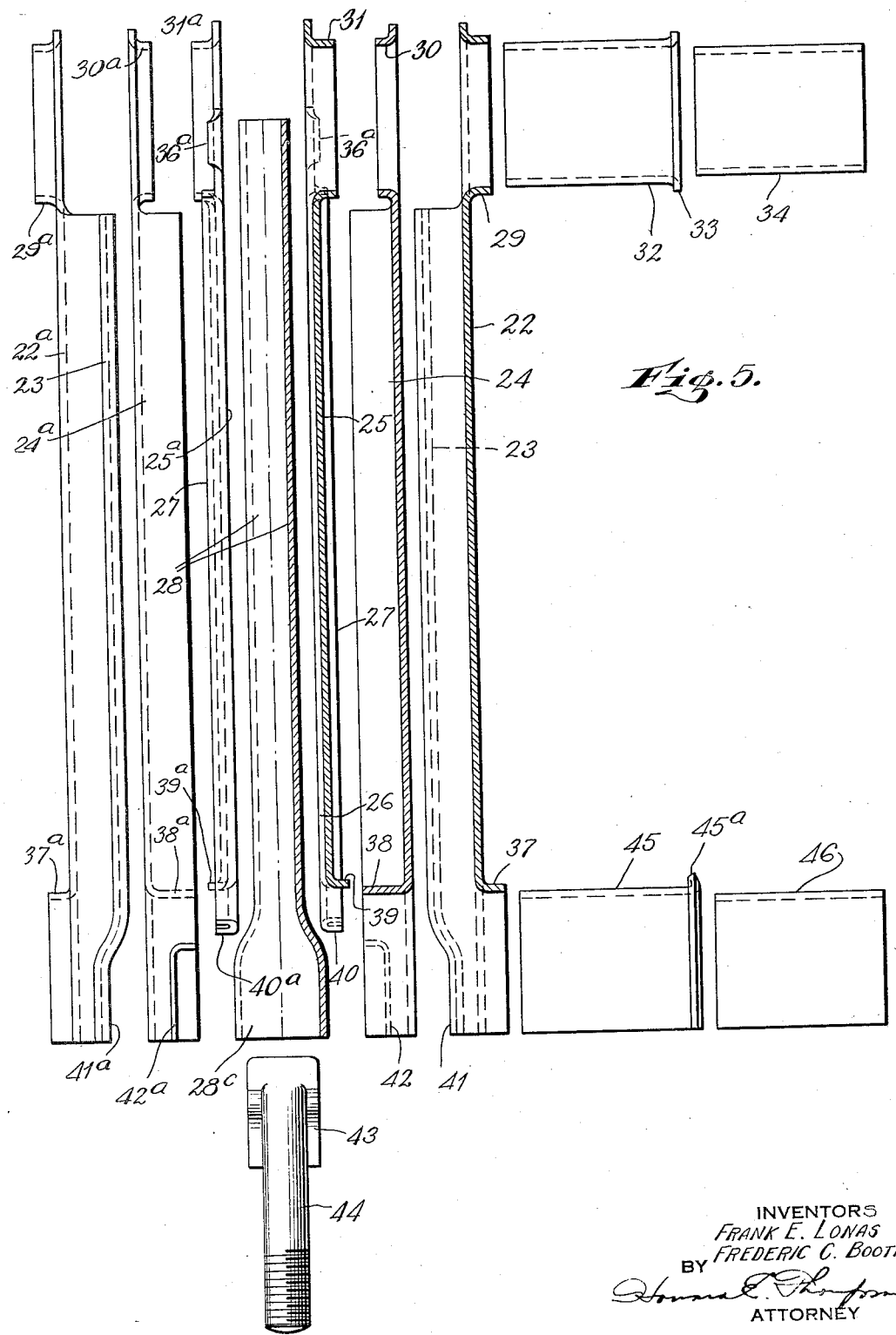
Fig. 5 is an exploded view showing the several parts employed in constructing the rod shown in Figs. 1 and 2 in substantially their related positions, and parts of the construction being shown in section.

For the purpose of illustrating two distinct uses of the invention, Figs. 1 and 2 together with associated figures show what might be termed a narrow two-bolt rod, the method of assemblage of which is indicated by the exploded view, Fig. 5, whereas in Figs. 6 and 7 and associated views, a wider four-bolt or stud rod is shown, the structure of certain parts of which is slightly modified.

In Figs. 1 and 2, the rod consists of a tubular shank 21 formed of outer semi-circular wall parts 22, 22a, terminating at their edges in outwardly curved flanges 23, and inner semi-circular wall parts 24, 24a. Within the parts 24, 24a are transverse bracing and reinforcing plates 25, 25a, bent outwardly on the original center thereof to form between adjacent surfaces of said plates an oil passage or duct 26. The side edges of the plates 25, 25a terminate in outwardly extending and slightly curved flanges 27 which seat in or rest upon the inner surfaces of the parts 24, 24a. Two channel-shaped coupling strips 28 are employed at opposite sides of the shank, one strip being indicated from the outer surface at one side of the center line x, Fig. 5, and the other strip from the inner surface at the other side of said center line. The side edges of these strips 28 are bent or crimped inwardly to interlock with the outwardly curved flanges 23 of the parts 22, 22a as is indicated at 28a in Fig. 4 of the drawings, thus serving to securely retain all of the parts in their assembled relationship with respect to each other and without possible movement of the parts longitudinally one with respect to the other.

The parts 22—22a include at their upper ends and in alinement with the outer wall surfaces of said parts outwardly extending circular collars 29, 29a respectively. In like manner, the parts 24, 24a have inwardly extending circular collars 30, 30a and the parts 25, 25a have outwardly extending collars 31, 31a. All of these collars are of the same diameter to receive a tubular bearing sleeve 32, one end of which is normally flanged outwardly as seen at 33, and the other end of which is flanged outwardly after the rod parts have been assembled as indicated at 33a in Fig. 1 of the drawings. The length of the sleeve 32 is equal or substantially equal to the combined length of the collar portions 29 to 31a inclusive so that when the parts are firmly brought together with their adjacent surfaces abutting, the flanges 33, 33a will seat snugly upon the outer surfaces of the collars 29, 29a.

Within the sleeve 32 is a facing or bushing 34 of suitable bearing material. Each of the parts 22, 22a, 24, 24a, 25, 25a extends beyond the shank portions of said parts and onto the pintle bearing portions thereof in annular flanges, and the flanges of the parts 22, 24, 22a, 24a abut to form annular ribs 35, 35a which are positioned adjacent the ends of the pintle bearing or are substantially in alinement with the diameter of the tubular portion 21, whereas corresponding flanges on the parts 25, 25a abut to form central reinforcing ribs 36. The latter flanges at the lower or inner part of the wrist pin bearing are turned out to form curved flange portions 36a, note Figs. 2 and 3 of the drawings, which curved portions 36a are engaged by the upper ends of the strips 28 where they extend onto the lower part of the wrist pin bearing as is indicated at 28b.

The other end or crank shaft bearing ends of the parts 22, 24 and 25 flare outwardly in a substantially yoke-shaped or forked arrangement. The outer parts 22, 22a have outwardly extending semi-circular collar portions 37, 37a; the parts 24, 24a inwardly extending semi-circular collar portions 38, 38a; and the parts 25, 25a have short arc-shaped collar portions 39, 39a, the latter of which terminate in U-shaped extensions 40, 40a, which serve to brace and reinforce the outer wall portion of the parts 24 and 24a with respect to the collar portions 38, 38a thereof as is indicated in Fig. 17 of the drawings.

The parts 22, 22a are offset laterally as indicated at 41, 41a, note Fig. 5 of the drawings, and the parts 24, 24a have similar offsets 42, 42a. The latter, when the parts 24 and 24a are joined form a socket for receiving a flattened and arc-shaped headed end 43 on coupling studs 44 in the manner illustrated in Figs. 2 and 16 of the drawings. These studs also fit within widened lower ends 28c of the coupling strips 28. A semi-circular bearing sleeve 45 seats within the collars 37 and 38 of the parts 22 and 24 and the collars of the companion parts. One end of the sleeve 45 has a hook-shaped flange 45a and the other end is fashioned to form a hook flange 45b when the parts are assembled. A bushing of suitable bearing material 46 is disposed within the sleeve 45.

In Figs. 1 and 2 of the drawings, a cap 47 is shown coupled with the studs 44 by suitable nuts 48, the cap 47 being made from a forging or in any other manner and includes bosses 47a for receiving the studs, reinforcing ribs 47b and a liner 49 of suitable bearing material. The cross-sectional form of the flared yoke-shaped lower end of the rod will give strength and rigidity to said end and distribute the stresses or strains throughout the entire crank-shaft bearing as may be seen from a consideration of Figs. 16 and 17 of the drawings.

In assembling the several parts of the rod, the parts or members 25, 25a are first brought together, after which the parts 24, 24a are arranged upon the first named parts with the studs 44 arranged in position, after which the parts 22, 22a are mounted upon the parts 24, 24a. Coupling strips 28 are then moved into position to envelop the flanges 23 and by holding the parts in proper alinement one with respect to the other which may be done in the first place by inserting the sleeve 32 in position and with pressure applied to the parts 22, 22a to force said parts together, the side walls of the strips 28 are crimped, spun or die pressed inwardly to firmly engage the flanges 23 and secure the parts together.

Prior to doing this, however, strips or rods of suitable brazing material such as copper, are placed in the crevices formed between the parts at their joining or abutting edges. For example, in considering Fig. 4 of the drawings, these strips will be disposed in the corners or crevices between the flanges 27 and the walls of the parts 24, 24a and between said latter parts and the flanges 23 and also between the flanges 23 and the strips 28 including the inturned side walls 28a, in like manner between the surfaces of the wrist pin end and crank shaft end of the rod, so that the complete assemblage may be placed in a hydrogen electric furnace and heat treated to produce copper brazing between adjacent abutting surfaces of the parts or the contacting areas thereof. The copper brazing material will extend throughout the contacting surfaces or areas of the parts to firmly and positively unite said parts forming a strong and durable construction.

The construction of the rod shown in Figs. 6 and 7 of the drawings in so far as certain main parts are concerned is substantially the same as that shown in Figs. 1 and 2 of the drawings. As to these parts, brief reference only will be made. For example, the parts 50, 50a in Figs. 6 and 7 of the drawings are substantially identical to the parts 22, 22a except as to size and slightly different contour, whereas the parts 51, 51a are substantially similar to the parts 24, 24a with the exception that instead of terminating in abutting edges, note Fig. 4, the parts 51, 51a terminate at their edges in inturned abutting flanges 52 which extend from the upper pintle bearing 53 to the lower crank shaft bearing 54. With the construction shown in Figs. 6 and 7, coupling strips 55, similar to the strips 28, are employed, turned or pressed inwardly as indicated at 55a to engage the outwardly curved flanges 56 of the parts 50, 50a.

In Figs. 6 and 7 of the drawings, instead of employing the plates 25, 25a, separate end members 57 and 58 are employed, the former being shown in detail in Figs. 10 and 11 of the drawings and the latter in Figs. 12 and 13 of the drawings. A pair of members 57 is employed at the wrist pin bearing end 53 of the rod and includes collar portions 51a equivalent to the collar portions 31, flanges 57b equivalent to the flanges 36a and a downwardly extending as well as offset tongue 57c adapted to overlap the upper ends of the flanges 52 as may be seen in Figs. 6 and 7 of the drawings to securely retain the parts in position.

The members 58 have semi-circular collar portions 58a which are in alinement with inturned collars 51b on the parts 51, 51a as may be seen on a consideration of Fig. 6 of the drawings. The members 58 also have outwardly extending side flanges 58b which form reinforced members for the inwardly flared crank shaft bearing portion of the tubes 51, 51a as may be seen upon a consideration of Fig. 15 of the drawings. These flanges terminate short of the flattened and curved heads 60 of the studs 61. The parts 51, 51a have extending tongues 62 which enter the slots 59 of the studs 61 which aid in keying and alining the parts one with respect to the other. The curved contour of the heads 60 is such as to seat upon the outer surface of the collar portion 51b and upon the inner surface of the lower end of the tubular parts 50, 50a, one of which mountings is illustrated in Fig. 9 of the drawings. In other words, the lower ends of the parts 50, 50a enclose the studs 61 as may be seen upon a consideration of Fig. 14 of the drawings.

The members 58 include upwardly directed offset tongues 58c which lie upon the lower portions of the flanges 52 as is clearly illustrated in Figs. 6 and 7 of the drawings so as to securely retain the parts together and to reinforce the same centrally of the forked or U-shaped end of the rod. The wrist pin end of the rod or the separate parts thereof, is joined by a sleeve 63 similar to the sleeve 32 and in which is disposed a tube or facing of bearing material 64. A semi-circular sleeve 65 couples the lower end of the parts and within which is a semi-circular lining of suitable bearing material 66.

The several parts of the rod shown in Figs. 6 and 7 of the drawings and in the companion figures are assembled and secured together by the coupling strips 55, after which the assembled rod is placed in a copper brazing hydrogen electric furnace. It will be understood that the copper brazing material or strips have previously been laid or mounted adjacent the joints or contacting surfaces between the parts so that the abutting or contacting surfaces will be brazed together to form a strong and durable rod structure.

The forms of the rods herein disclosed are merely illustrative of possible or desirable methods of constructing a comparatively narrow two-stud rod or a wider four-stud rod, but in both cases, the details of construction of the several rod parts or members may be modified within the scope of the appended claims.

Heretofore, in the construction of rods having shanks of tubular or I-beam cross sectional form, it has been the custom to restrict the stress distribution from the shank to the bearing ends of the rods, which was largely made necessary by virtue of the method of constructing the rod. While rods composed of two or more sheet metal parts are old, these types of rods have failed to provide the proper strength and rigidity throughout the entire rod structure, and especially in distribution of load upon the bearing ends of the rod.

In the present invention, these objectionable features are overcome by extending the brazing or reinforcing ribs as well as the wall structure of the several rod parts onto the respective bearing ends in order to provide proper distribution of the stress and to substantially eliminate any possible rocking or longitudinal oscillatory movement of the bearings upon their supports. By constructing the rod from preformed parts, each in itself of a rigid construction and by securing said parts together, first by the coupling strips and then by the copper brazing, a very strong and durable as well as a light and substantially balanced rod is produced.

It will also appear that a very simple method is provided for coupling and securing the studs to the rod which provides a neat and efficient crank shaft bearing end to the resultant rod. The studs are also retained against rotary or other movement with respect to the rod, and this method of coupling the parts together also acts to reinforce said end of the rod.

Having fully described our invention, what we claim as new and desire to secure by Letters Patent, is:

1. A connecting rod of the class described composed of a plurality of preformed sheet metal parts, two of the parts being used in pairs to form the shank and end bearings of the rod, the shank portions of said pairs of parts being substantially semi-circular in cross sectional form to provide when said pairs of parts are assembled a double wall tubular shank, the outer pairs of parts having outwardly extending flanges, coupling strips fashioned to engage said flanges to secure said parts together, the ends of the outer pair of parts including outwardly extending collar portions and the ends of the inner pair of parts including inwardly extending collar portions which in conjunction with the first named collar portions partially form the bearings at the ends of said rod.

2. A connecting rod of the class described composed of a plurality of sheet metal parts, two of the parts being used in pairs to form the shank and end bearings of the rod, the shank portions of said pairs of parts being substantially semi-circular in cross sectional form to provide when said pairs of parts are assembled a double wall tubular shank, the outer pairs of parts having outwardly extending flanges, coupling strips fashioned to engage said flanges to secure said parts together, the ends of the outer pair of parts including outwardly extending collar portions, the ends of the inner pair of parts including inwardly extending collar portions which in conjunction with the first named collar portions partially form the bearings at the ends of said rod, and bearing sleeves disposed within said collar portions and serving to hold said collar portions against separation.

3. A connecting rod of the class described composed of a plurality of sheet metal parts, two of the parts being used in pairs to form the shank and end bearings of the rod, the shank portions of said pairs of parts being substantially semi-circular in cross sectional form to provide when said pairs of parts are assembled a double wall tubular shank, the outer pairs of parts having outwardly extending flanges, coupling strips fashioned to engage said flanges to secure said parts together, the ends of the outer pair of parts including outwardly extending collar portions, the ends of the inner pair of parts including inwardly extending collar portions which in conjunction with the first named collar portions partially form the bearings at the ends of said rod, bearing sleeves disposed within said collar portions and serving to hold said collar portions against separation, and means centrally of the tubular shank of the rod at the bearing end portions thereof for reinforcing the same.

4. A connecting rod of the class described composed of a plurality of sheet metal parts, two of the parts being used in pairs to form the shank and end bearings of the rod, the shank portions of said pairs of parts being substantially semi-circular in cross sectional form to provide when said pairs of parts are assembled a double wall tubular shank, the outer pairs of parts having outwardly extending flanges, coupling strips fashioned to engage said flanges to secure said parts together, the ends of the outer pair of parts including outwardly extending collar portions, the ends of the inner pair of parts including inwardly extending collar portions which in conjunction with the first named collar portions partially form the bearings at the ends of said rod, bearing sleeves disposed within said collar portions and serving to hold said collar portions against separation, means centrally of the tubular shank of the rod at the bearing end portions thereof for reinforcing the same, and flanges on said pairs of parts for reinforcing said bearings.

5. A connecting rod of the class described composed of a plurality of sheet metal parts, two of the parts being used in pairs to form the shank and end bearings of the rod, the shank portions of said pairs of parts being substantially semi-circular in cross sectional form to provide when said pairs of parts are assembled a double wall tubular shank, the outer pairs of parts having outwardly extending flanges, coupling strips fashioned to engage said flanges to secure said parts together, the ends of the outer pair of parts including outwardly extending collar portions, the ends of the inner pair of parts including inwardly extending collar portions which in conjunction with the first named collar portions partially form the bearings at the ends of said rod, bearing sleeves disposed within said collar portions and serving to hold said collar portions against separation, means centrally of the tubular shank of the rod at the bearing end portions thereof for reinforcing the same, flanges on said pairs of parts for reinforcing said bearings, and the crank shaft bearing end of the rod including studs having flattened head portions disposed within and seating between the parts of said rod.

6. A connecting rod of the class described composed of a plurality of sheet metal parts, two of the parts being used in pairs to form the shank and end bearings of the rod, the shank portions of said pairs of parts being substantially semi-circular in cross sectional form to provide when said pairs of parts are assembled a double wall tubular shank, the outer pairs of parts having outwardly extending flanges, coupling strips fashioned to engage said flanges to secure said parts together, the ends of the outer pair of parts including outwardly extending collar portions, the ends of the inner pair of parts including inwardly extending collar portions which in conjunction with the first named collar portions partially form the bearings at the ends of said rod, bearing sleeves disposed within said collar portions and serving to hold said collar portions against separation, means centrally of the tubular shank of the rod at the bearing end portions thereof for reinforcing the same, flanges on said pairs of parts for reinforcing said bearings, the crank shaft bearing end of the rod including studs having flattened head portions disposed within and seating between the parts of said rod, and abutting surfaces of the rod parts being secured together by copper brazing.

7. A sheet metal connecting rod composed of a plurality of preformed pairs of sheet metal parts, one pair of parts forming the outer wall structure of the shank of the rod and the side edges of which terminate in abutting outwardly extending flanges, the shank portion of said pair of parts aside from said flanges being circular in cross sectional form, another pair of semi-circular parts disposed and fitting snugly within the shank portion of the first named pair of parts, the side edges of said semi-circular inner parts abutting, and coupling strips fashioned to engage the outwardly extending flanges of the first named pair of parts to secure said parts together.

8. A sheet metal connecting rod composed of a plurality of preformed pairs of sheet metal parts, one pair of parts forming the outer wall structure of the shank of the rod and the side edges of which terminate in abutting outwardly extending flanges, the shank portion of said pair of parts aside from said flanges being circular in cross sectional form, another pair of semi-circular parts disposed and fitting snugly within the shank portion of the first named pair of parts, the side edges of said semi-circular inner parts abutting, coupling strips fashioned to engage the outwardly extending flanges of the first named pair of parts to secure said parts together, and another pair of sheet metal parts arranged within the shank portion of said inner pair of parts and extending longitudinally thereof and abutting opposed walls of said inner parts.

9. A sheet metal connecting rod composed of a plurality of preformed pairs of sheet metal parts, one pair of parts forming the outer wall structure of the shank of the rod and the side edges of which terminate in abutting outwardly extending flanges, the shank portion of said pair of parts aside from said flanges being circular in cross sectional form, another pair of semi-circular parts disposed and fitting snugly within the shank portion of the first named pair of parts, the side edges of said semi-circular inner parts abutting, coupling strips fashioned to engage the outwardly extending flanges of the first named pair of parts to secure said parts together, another pair of sheet metal parts arranged within the shank portion of said inner pair of parts and extending longitudinally thereof and abutting opposed walls of said inner parts, and said last named pair of parts having a passage formed between adjacent surfaces and extending longitudinally thereof.

10. A connecting rod of the class described comprising a tubular shank portion, a wrist pin bearing at one end of the shank portion and a yoke-shaped crank shaft bearing at the other end of the shank portion, the rod being formed from two similar pairs of sheet metal parts including integral wrist pin and crank shaft bearing portions, said pairs of parts abutting each other longitudinally of the rod in a plane at right angles to the axis of said bearing portions, and means comprising circular collar portions at the wrist pin end of the rod and semi-circular collar portions at the crank shaft end of the rod and parts extending into the tubular shank of the rod for partially forming the bearings and for reinforcing the shank of said rod.

11. A connecting rod of the class described comprising a tubular shank portion, a wrist pin at one end of the shank portion and a yoke-shaped crank shaft bearing at the other end of the shank portion, said shank portion being formed from inner and outer similar pairs of sheet metal parts, the outer pair of parts having outwardly extending circular wrist pin and semi-circular crank shaft bearing portions, the inner pair of parts having inwardly extending circular wrist pin and semi-circular crank shaft bearing portions, the bearing portions of both inner and outer pairs of parts being joined by said tubular shank portions, adjacent edges of the pairs of parts abutting each other longitudinally of the rod in a plane at right angles to the axis of the bearing portions, the outer pair of parts having at their adjacent edges outwardly curved flanges, and means engaging said flanges for securing all of said rod parts together.

12. A connecting rod of the class described comprising a tubular shank portion, a wrist pin at one end of the shank portion and a yoke-shaped crank shaft bearing at the other end of the shank portion, said shank portion being formed from inner and outer similar pairs of sheet metal parts, the outer pair of parts having outwardly extending circular wrist pin and semi-circular crank shaft bearing portions, the inner pair of parts having inwardly extending circular wrist pin and semi-circular crank shaft bearing portions, the bearing portions of both inner and outer pairs of parts being joined by said tubular shank portions, adjacent edges of the pairs of parts abutting each other longitudinally of the rod in a plane at right angles to the axis of the bearing portions, the outer pair of parts having at their adjacent edges outwardly curved flanges, means engaging said flanges for securing all of said rod parts together, sleeves for joining the separate parts of the rod at the bearing end portions thereof and another pair of parts arranged longitudinally of the tubular portions of the rods and transversing said tubular portions for reinforcing the same.

13. A connecting rod of the class described comprising a tubular shank portion, a wrist pin at one end of the shank portion and a yoke-shaped crank shaft bearing at the other end of the shank portion, said shank portion being formed from inner and outer similar pairs of sheet metal parts, the outer pair of parts having outwardly extending circular wrist pin and semi-circular crank shaft bearing portions, the inner pair of parts having inwardly extending circular wrist pin and semi-circular crank shaft bearing portions, the bearing portions of both inner and outer pairs of parts being joined by said tubular shank portions, adjacent edges of the pair of parts abutting each other longitudinally of the rod in a plane at right angles to the axis of the bearing portions, the outer pair of parts having at their adjacent edges outwardly curved flanges, means engaging said flanges for securing all of said rod parts together, sleeves for joining the separate parts of the rod at the bearing end portions thereof, and another pair of parts arranged longitudinally of the tubular portions of the rods and transversing said tubular portions for reinforcing the same, said last named pairs of parts including side and end flanges.

14. A connecting rod of the class described comprising a tubular shank portion, a wrist pin at one end of the shank portion and a yoke-shaped crank shaft bearing at the other end of the shank portion, said shank portion being formed from inner and outer similar pairs of sheet metal parts, the outer pair of parts having outwardly extending circular wrist pin and semi-circular crank shaft bearing portions, the inner pair of parts having inwardly extending circular wrist pin and semi-circular crank shaft bearing portions, the bearing portions of both inner and outer pairs of parts being joined by said tubular shank portions, adjacent edges of the pairs of parts abutting each other longitudinally of the rod in a plane at right angles to the axis of the bearing portions, the outer pair of parts having at their adjacent edges outwardly curved flanges, means engaging said flanges for securing all of said rod parts together, and the adjacent abutting surfaces of the respective rod parts being copper brazed together in a hydrogen atmosphere.

FRANK E. LONAS.
FREDERIC C. BOOTH.